(No Model.)

A. E. WALLACE.
VELOCIPEDE.

No. 314,633. Patented Mar. 31, 1885.

WITNESSES
Ernest R. Benson
H. I. Nash

INVENTOR
Albert E. Wallace
By Charles E. Pratt
Atty

United States Patent Office.

ALBERT E. WALLACE, OF HARTFORD, CONNECTICUT, ASSIGNOR TO THE POPE MANUFACTURING COMPANY, OF SAME PLACE.

VELOCIPEDE.

SPECIFICATION forming part of Letters Patent No. 314,633, dated March 31, 1885.

Application filed April 9, 1884. (No model.)

*To all whom it may concern:*

Be it known that I, ALBERT E. WALLACE, of the city and county of Hartford and State of Connecticut, have invented certain new and useful Improvements in Velocipedes, of which the following is a specification.

In the construction of velocipedes—such as tricycles—having two separate driving-wheels abreast, it has been found necessary in order to complete efficiency that some device should be interposed between the "driving mechanism," so-called, and the wheels, by which a differential motion may be given or allowed to the two wheels, so that either may turn faster or slower than the other on curves, and share more or less of the power in meeting obstructions. Such a device is set forth in Letters Patent of E. Whitehead, No. 194,980, dated September 11, 1877, which contrivance, and those substantially like it, have become known as "balance-gears," or "differential gears," in connection with velocipede-manufacture, and my invention herein described is in the nature of improvements upon the device shown by Whitehead.

My improvements consist in certain parts and combinations of mechanism, which will be readily understood from the following description and from the accompanying drawings, in which—

Figure 1:
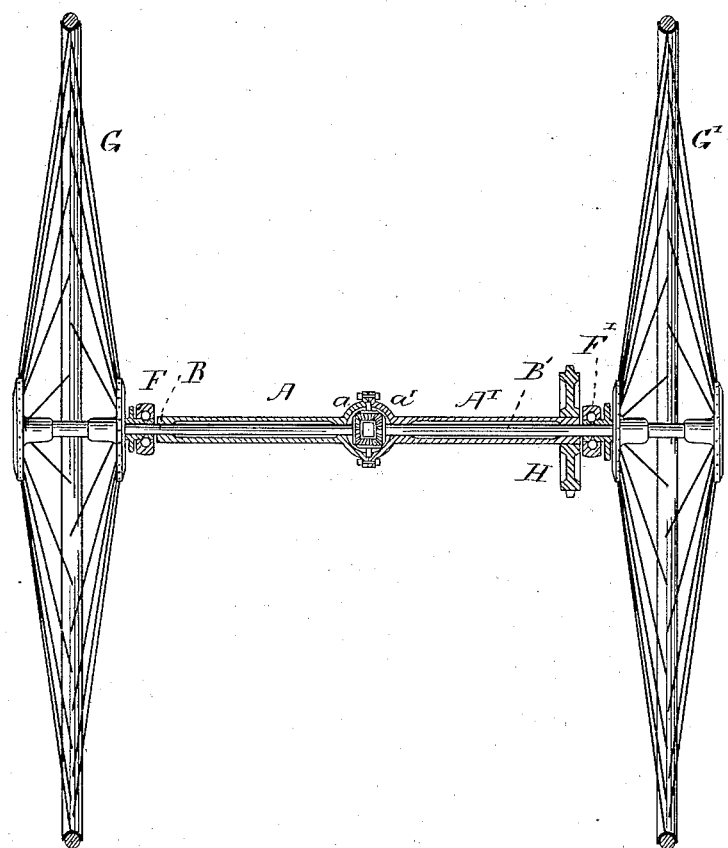
Figure 2:
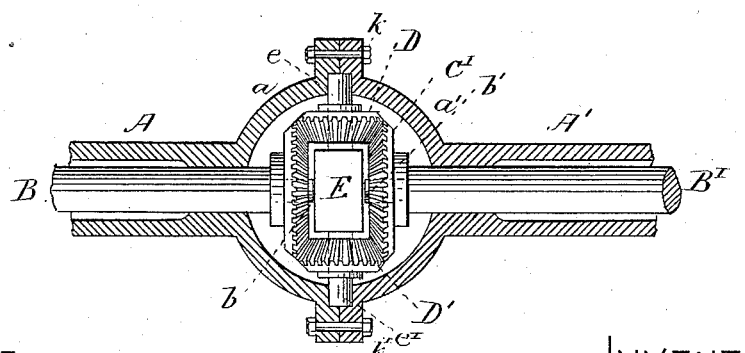

Figure 1 represents partly in longitudinal vertical section the two supporting and driving wheels of a velocipede and the essential connecting devices between, showing my improvements in one form, and Fig. 2 shows in part section and in part elevation an epicyclic balance-gear, showing part of the same improvements more distinctly.

B B' are shafts or axles arranged upon the same axial line. G G' are wheels fixed to rotate with said axles respectively. F F' are bearing-boxes in which said axles are respectively free to rotate, and which boxes may be connected in any suitable manner with the frame of the velocipede.

A A' form a sleeve or outer axle inclosing the axles B B' and having free bearings thereon, and may be made in one part; but I prefer to make them in two parts, as herein shown, and with an enlargement at $a\,a'$, which is shown in globular form, but may be in any other form, and at which the two parts of the sleeve may be connected together by means of small bolts $k\,k'$ or otherwise.

H is a power-wheel, which may be a sprocket-wheel, as shown, or a spur-gear wheel or pulley for a band, and which is to be connected with the driving-shaft of the velocipede by means of chain, band, or intermediate gear or similar contrivance. This power-wheel H is fixed to revolve with the sleeve A on any part thereof, though I prefer to place it at one end, as shown.

C C' are toothed wheels fixed on the axles B B', respectively, and D D' are other toothed wheels adapted to engage with and revolve between the wheels C C', and, as I prefer to make them, are supported freely on the spindles or transverse axes $e\,e'$, forming projecting parts of the transverse block-shaft E. The block-shaft E is rectangular in the middle portion, and its two opposite sides serve as resting-surfaces for the ends $b\,b'$ of the axles B B', while its axle elongations $e\,e'$ are cylindrical and serve as a practically-continuous shaft on which the wheels D D' revolve, and which take their support at either end outside of said wheels in the enlarged portion of the sleeve. One of these wheels D D' may be dispensed with, or they may be made in the form of spur-gears instead of bevel-gears, as shown, the wheels C C' being made as crown-wheels; or the wheels C C' may be made, one as an annular gear and the other as a spur-gear, and the wheel D may be placed as a spur-gear between the two; or the block-shaft E may be secured at only one end in the sleeve; or part of my improvements can be availed of without the presence of the block E, and other modifications of the structure may be made without departing from the spirit of my invention, though I believe that all my improvements shown are necessary to the best and most satisfactory working of the velocipede, the presence of the second intermediate wheel, D', for instance, serving not only as a balance in weight to the other, but also to relieve D of a part of the strain and to make the working more even. The continuous shaft $e\,e'$, secured at both ends with the sleeve, makes a much firmer and more accurate structure, and the use of the block part E, forming on its opposite sides stops or resting-points for the axles, also contributes to the firmness and accuracy of the structure and saves it much wear and tear from the thrust of the axles.

The operation of my contrivance is as follows: When power is transmitted to the power-wheel H, so as to cause it to revolve, it makes the sleeve revolve and the block-shaft endwise with it, and, therefore, since there is equal power distributed to either side of the bevel-wheel D, equal motion of revolution is distributed to the wheels C C', the axles A A', respectively, and the wheels G G' are caused to revolve with equal speed. If, now, by operation of a steering device or otherwise, the velocipede be propelled on a curve to the inside of which G is nearest, G must travel slower than the average speed of the velocipede, and G' must travel faster, or else there will be a sliding of one or both wheels on the surface of the road, which latter is to be avoided; but by the operation of my device, when so traveling on a curve the revolution of H gives the average speed on the vehicle, and the bevel-wheels D D' revolving on their shaft allow the wheel G to revolve more slowly and the wheel G' to revolve faster than the average forward motion without sliding or loss of power, and, indeed, one wheel may revolve backward and the other forward at the same time under certain conditions.

It is obvious that among the advantages gained to the velocipede by my improvements are lightness, simplicity, economy, and a better arrangement of the parts, allowing the chain-wheel to be carried to the side of the vehicle, instead of being retained in the middle, and there are several other advantages which those skilled in the art will readily perceive.

I claim as new and of my invention—

1. The combination, in a velocipede, of a divided inner axle and a tubular outer axle or sleeve with a driving-wheel fixed thereon, and a differential gear of three or more toothed wheels, one of which is fixed on either of the parts of the divided axle and one on a pinion in an enlargement of the tubular axle inclosing said gear.

2. The combination, in a velocipede, of the following parts, namely: two main wheels on axles in the same axial line, two toothed wheels fixed one on each of the approximate ends of said axles, a sleeve on said axles offering one or more bearings for each and in which either of them is free to revolve, a chain-wheel or its equivalent fixed upon said sleeve, and a third toothed wheel pinioned in said sleeve or some part fixed thereon and meshing with the other two toothed wheels, all constructed and adapted to operate as a balance or power or speed distributing mechanism, essentially as set forth.

3. Axles B B', a transverse shaft between them, bevel-gears C C' D, sleeve $a$ $a'$ A', and power-wheel H, constructed and combined to operate in a velocipede as a differential mechanism, essentially as set forth.

4. In an epicyclic balance-gear of the class described, the transverse block-shaft $e$ $e'$, constructed and adapted to operate in combination with other parts of the mechanism, substantially as shown and described.

ALBERT E. WALLACE.

Witnesses:
GEO. H. DAY,
GEO. B. COBURN.